United States Patent [19]

Müller et al.

[11] Patent Number: 5,084,544
[45] Date of Patent: Jan. 28, 1992

[54] COLD SETTING REACTION RESIN MIXTURE AND USE THEREOF

[75] Inventors: Hanns-Peter Müller, Bergisch Gladbach; Joachim Franke, Cologne; Artur Botta, Krefeld, all of Fed. Rep. of Germany

[73] Assignee: Bayer Aktiengesellschaft, Leverkusen, Fed. Rep. of Germany

[21] Appl. No.: 457,661

[22] Filed: Feb. 6, 1990

[30] Foreign Application Priority Data

Feb. 11, 1989 [DE] Fed. Rep. of Germany ....... 3904156

[51] Int. Cl.$^5$ .................. B05D 5/12; C08G 18/30; C08G 18/00; C08G 18/14
[52] U.S. Cl. ................................... 528/73; 528/52; 528/53; 521/167; 521/168; 524/783; 427/116
[58] Field of Search ............... 525/208, 207; 520/107, 520/108, 104, 110, 112; 528/73, 52, 53; 524/783; 427/116

[56] References Cited

U.S. PATENT DOCUMENTS

| | | | |
|---|---|---|---|
| 3,673,128 | 6/1972 | Hayash, Jr. et al. .................. | 528/73 |
| 3,721,650 | 3/1973 | D'Alelio .............................. | 260/47 |
| 4,264,744 | 4/1981 | Mijovanovic et al. ............. | 521/110 |
| 4,304,818 | 12/1981 | Hirata et al. ........................ | 428/413 |
| 4,564,651 | 1/1986 | Markert et al. ..................... | 524/589 |
| 4,582,723 | 4/1986 | Markert et al. ..................... | 427/116 |
| 4,631,306 | 12/1986 | Markert et al. ..................... | 523/457 |
| 4,728,676 | 3/1988 | Müller et al. ....................... | 521/107 |
| 4,766,172 | 8/1988 | Weber et al. ....................... | 524/783 |
| 4,777,227 | 10/1988 | Wrezel et al. ...................... | 525/208 |
| 4,788,224 | 11/1988 | Müller et al. ....................... | 528/53 |
| 5,021,536 | 6/1991 | Müller et al. ....................... | 528/73 |

*Primary Examiner*—John Kight, III
*Assistant Examiner*—Duc Truong
*Attorney, Agent, or Firm*—Joseph C. Gil; Richard E. L. Henderson

[57] ABSTRACT

The present invention relates to a reaction resin composition comprising a mixture of polyisocyanates, epoxides, and amine catalysts of the formula

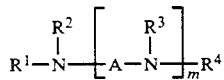

wherein A is independently alkylene, alkenylene, alkynylene, alkylidene, cycloalkylene, or aralkenylene; m is an integer of from 0 to 30; $R^1$, $R^2$ and $R^3$ are independently optionally substituted aralkyl or polyaralkyl; and $R^4$ is alkyl, alkenyl, alkynyl, cycloalkyl, or optionally substituted aralkyl or polyaryalkyl.

18 Claims, No Drawings

COLD SETTING REACTION RESIN MIXTURE AND USE THEREOF

BACKGROUND OF THE INVENTION

This invention relates to reaction resin mixtures which set at room temperature and to their use for impregnating insulation of electrical apparatus and for preparing molding materials.

Reaction resin mixtures of organic polyisocyanates, organic (poly)epoxides, and special catalysts with isocyanurate and oxazolidinone structures are prepared by the polyaddition of (poly)epoxides with polyisocyanates using hardening catalysts. See European Application 130,454, German Offenlegungsschrift 3,323,084, or European Application 272,563. The use of catalysts, particularly tertiary amines, has been disclosed in German Auslegeschrift 1,115,922. The industrial application of these mixtures, however, is difficult because the known accelerators or accelerator systems (which are also mentioned, for example, in German Offenlegungsschrift 2,444,458) cause the mixtures to harden either too rapidly or too slowly, thereby preventing the economical production of insulation or molding materials containing such mixtures of accelerators. These difficulties can arise when the viscosity of the reaction resin mixture sometimes rises too rapidly for complete impregnation or instantaneous reactions that lead to the formation of jellylike deposits take place at the surface of contact of the resin when the accelerators are introduced into the reaction resin mixtures. When the accelerator systems are relatively slow to react, however, hardening at room temperature does not take place within an economically acceptable period of time. A further disadvantage is the unpleasant odor of the aminic accelerators known in the art.

It is therefore an object of the present invention to develop reaction resin mixtures which harden at room temperature from polyisocyanate-(poly)epoxide resin compounds that are relatively free from odor and will not undergo an instantaneous change in viscosity at room temperature but which still harden with sufficient rapidity to be economical.

SUMMARY OF THE INVENTION

The present invention relates to a reaction resin composition comprising a mixture of
(a) at least one polyisocyanate;
(b) at least one epoxide; and
(c) at least one amine of the formula

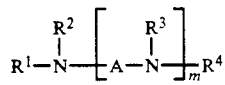

(I)

wherein
A is independently straight-chained or branched, optionally substituted, $C_1$-$C_{20}$ alkylene, $C_2$-$C_{20}$ alkenylene, $C_2$-$C_{20}$ alkynylene, $C_2$-$C_{20}$ alkylidene, $C_3$-$C_{12}$ cycloalkylene, or $C_7$-$C_{20}$ aralkenylene,
m is an integer of from 0 to about 30,
$R^1$, $R^2$ and $R^3$ are independently optionally substituted aralkyl or polyaralkyl of the formula

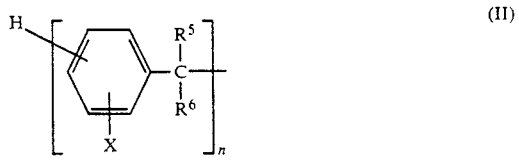

wherein
$R^5$ and $R^6$ are independently hydrogen or lower alkyl,
X is hydrogen, lower alkyl, lower alkoxy, lower alkoxycarbonyl, lower alkylthiocarbonyl, or halogen, and
n is an integer of from 1 to about 50, and
$R^4$ is straight-chained or branched, optionally substituted, $C_1$-$C_{20}$ alkyl, $C_1$-$C_{20}$ alkenyl, $C_1$-$C_{20}$ alkynyl, $C_3$-$C_{12}$ cycloalkyl, or optionally substituted aralkyl or polyaralkyl of the formula

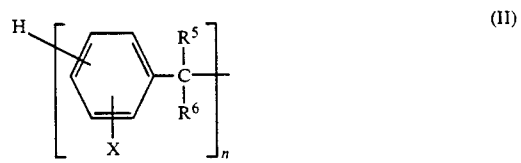

(II)

wherein, $R^5$, $R^6$, X, and n are as defined above.

DETAILED DESCRIPTION OF THE INVENTION

The alkyl, alkenyl, alkynyl, alkylene, alkenylene, alkynylene, and alkylidene groups described above for formulas (I) and (II) may have from 1 to about 20 (preferably 1 to 12 and most preferably 1 to 6) carbon atoms. Examples of such groups include methyl, ethyl, propyl, butyl, isobutyl, hexyl, ethylhexyl, decyl, stearyl, vinyl, propenyl, isopropenyl, allyl, butenyl, isobutenyl, hexenyl, octenyl, dodecenyl, ethynyl, butynyl, hexynyl, methylene, ethylene, propylene, butylene, isobutylene, pentylene, neopentylene, hexylene, octylene, isooctylene, decylene, octadecylene, vinylene, butenylene, butadienylene, octenylene, heptadecenylene, ethynylene, butynylene, octynylene, ethylidene, propylidene, butylidene, isobutylidene, hexylidene, isohexylidene, octylidene, isooctylidene, and octadecylidene. Preferred such groups include methyl, ethyl, butyl, isobutyl, ethylhexyl, vinyl, propenyl, isopropenyl, allyl, butenyl, isobutenyl, ethynyl, butynyl, methylene, ethylene, propylene, butylene, isobutylene, pentylene, neopentylene, hexylene, decylene, vinylene, butenylene, octenylene, ethynylene, butynylene, ethylidene, propylidene, butylidene, isobutylidene, hexylidene, isohexylidene, octylidene, and isooctylidene. Particularly preferred such groups include methyl, ethyl, butyl, isobutyl, allyl, hexyl, methylene, ethylene, propylene, butylene, isobutylene, pentylene, neopentylene, hexylene, ethylidene, propylidene, butylidene, and isobutylidene.

The cycloalkyl and cycloalkylene groups described above for formulas (I) and (II) may have from 3 to about 12 (preferably 5 to 7) carbon atoms. Examples include cyclohexyl, methylcyclohexyl, and 1,2-, 1,3-, and 1,4-cyclohexylene.

The aralkyl and the aralkenyl groups may each have 7 to about 20 (preferably 7 to 12 and most preferably 7 to 9) carbon atoms. Examples include benzyl, α-methylbenzyl, α,α-dimethylbenzyl, 4-methylbenzyl, tert-butylbenzyl, methoxybenzyl, 3-chlorobenzyl, phenethyl, benzylene, and 1,2-, 1,3-, and 1,4-xylylene. Benzyl and xylylene are preferred.

The polyaralkylene groups may have 7 to about 18 (preferably 7 to 12 and most preferably 7 to 9) carbon atoms per unit. When polyaralkylene groups are present, they generally have from 2 to about 50 (preferably 2 to 30 and most preferably 2 to 12) aralkylene units.

The halogen substituent may be fluorine, chlorine, bromine, or iodine, but is preferably chlorine.

In a preferred embodiment, the amine accelerator component (c) has the formula

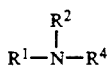

(that is, formula (I) wherein m is 0) wherein $R^1$ and $R^2$ are independently optionally substituted aralkyl, preferably benzyl (that is, formulas (I) and (II) wherein n is 1 or 2 and $R^5$, $R^6$, and X are all hydrogen), and $R^4$ is $C_1$-$C_4$ alkyl, preferably methyl.

In another preferred embodiment, the amine accelerator component (c) has the formula

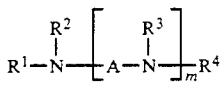

wherein m is an integer of from 1 to 5 (preferably 4); A is ethylene; and , R3, and R4 are independently optionally substituted aralkyl, preferably benzyl (that is, formula (II) wherein n is 1 and $R^5$, $R^6$, and X are all hydrogen).

Methyldibenzylamine ("MDBA") and heptabenzyltetraethylenepentamine ("HBTPA") are particularly preferred amine accelerators in the context of this invention Substituents that may be present in the optionally substituted preferred embodiments mentioned above include halogen (preferably chlorine), lower alkyl (that is, $C_1$-$C_6$ alkyl) groups, lower alkoxy groups, lower alkylthiocarbonyl groups, and lower alkyloxycarbonyl groups The preparation of polyaralkylated amines according to the invention is described, for example, in German Offenlegungsschrift 3,730,475. Specific examples of multiaralkylated amines suitable for use as moderated amine accelerators for the reaction resin compositions acoording to the invention include dibenzylmethylamine, -ethylamine, -propylamine, -butylamine, -isobutylamine, -hexylamine, -ethylhexylamine, -dodecylamine, -stearylamine, -allylamine, -cyclohexylamine, and -phenethylamine; tribenzylamine; di(p-methylbenzyl)-, di(α-methylbenzyl)- and di(methoxybenzyl)methylamine and -butylamine; tetrabenzylmethylenediamine, -ethylenediamine, -propylenediamine, -propylidenediamine, -butylenediamine, -butylidenediamine, -hexamethylenediamine, -octamethylenediamine, -cyclohexylene-1,4-diamine, -cyclohexylidenediamine, -isophoronediamine, and -xylylene diamine; pentabenzyldiethylenetriamine and -dipropylenetriamine; hexabenzyltriethylenetetramine, -tripropylenetetramine, and -N,N'-bis(aminopropyl)ethane; heptabenzyltetraethylenepentamine; octabenzylpentaethylenehexamine; nonabenzylhexaethyleneheptamine; decabenzylheptaethyleneoctamine; N-benzyl-N-(dibenzyl)-, N-(tribenzyl)-N-(pentabenzyl)-, and N-(pentabenzyl)-N-(heptabenzyl)methylamine, -butylamine, -allylamine, and -cyclohexylamine; N-benzyl-N-(tribenzyl)-N'-(tetrabenzyl)-N'-(hexabenzyl)-ethylenediamine, -propylenediamine, -butylenediamine, -isophoronediamine; and -xylylenediamine; N-benzyl-N-(tribenzyl)-N'-benzyl-N''-(tetrabenzyl)-N''-(hexabenzyl)diethylenetriamine; N,N',N''-tribenzyl-N-(dibenzyl)-N'''-(dodecabenzyl)-dipropylenetriamine; N,N,N',N'',N'''-pentabenzyl-N''''-(octabenzyl)triethylenetetramine; N,N',N'',N'''-tetrabenzyl-N-(dibenzyl)-N''''-(tetrabenzyl)-N''''-(dodecabenzyl)tetraethylenepentamine; N,N,N',N'',N''',N'''',N'''''-heptabenzyl-N'''''-(octadecylbenzyl)pentaethylenehexamine; and mixtures thereof.

The reaction resins according to the invention are eminently suitable for the production of insulation for electrical apparatus, in particular for winding rods or spools of electrical machinery, and for the production of molded materials with or without inserts, fillers, dyes, and other optional auxiliaries and additives. The compositions of the invention can be kept at room temperature as liquids before hardening. When the preferred reaction resin mixtures composed of storage stable mixtures of polyisocyanates and (poly)epoxide compounds and compounds (c) undergo reaction, the mixtures harden at room temperature within a period of time eminently suitable for technical use.

Preferred storage stable reaction resin mixtures have a viscosity of from 20 to 20,000 mPa.s at 25° C.

Advantageously, the amines of formula (I) to be used according to this invention can be readily incorporated in the reaction resin mixtures of polyisocyanates and (poly)epoxides, have no unpleasant odor, and allow the user a processing period ("pot life") of from about 2 to about 4 hours. Despite the long pot life, subsequent solidification of the reactive resin system containing the preferred quantity of catalyst of about 3 to 6% by weight is completed within less than 120 minutes (e.g., Example 2, Table 1).

The impregnated or cast objects may subsequently be introduced into ovens in any desired position for final curing without any risk of seepage of the penetrated reaction resin mixture from the objects. When cured, the reaction resin mixture provides insulation or molded materials characterised by high dimensional stability under heat and high long-term heat resistance. Such materials may thus be used at the high operating temperatures, for example, as specified for insulation class H.

Molded materials prepared with the aid of, for example, methyldibenzylamine or heptabenzyltetraethyleneheptamine, with or without filler, have characteristically excellent properties. As used herein, the term "filled molded materials" means materials consisting of the resins according to the invention and ordinary commercial fillers such as quartz powder, mica, aluminium oxide, or glass fibres or fabrics.

It must be regarded as highly surprising that the polyaralkylated amines according to the invention corresponding to formula (I) combine the property of good pot life, which is so important to the user, with a hardening reaction that can take place at room temperature. Such results are particularly surprising since the use of only monobenzylated tertiary amines as accelerators provides a pot life of only about 15 to 25 minutes at room temperature. The properties of the accelerators according to the invention, which chemically are also tertiary amines, would not have been expected by one skilled in the art. Measured against the state of the art, the invention provides highly improved moderated accelerators that are highly adaptable in many ways to the wishes and requirements of the processor with respect to the spectrum of properties of the reaction resin compositions used.

The present invention also relates to the use of the multicomponent reactive resin mixtures according to the invention as starting components for the production of molded articles, materials for electrical insulation, coatings, adhesives, and foams.

Suitable starting components (a) include any organic polyisocyanates of the type known from polyurethane chemistry. Such polyisocyanates include aliphatic, cycloaliphatic, araliphatic, aromatic, and heteroaromatic polyisocyanates such as those described by W. Siefken in *Justus Liebigs Annalen der Chemie*, 562, pages 75 to 136, for example those corresponding to the following formula Q(NCO)$_n$ wherein n is a number of from 2 to about 4 (preferably 2) and Q is an aliphatic hydrocarbon group having 2 to about 18 (preferably 6 to 10) carbon atoms, a cycloaliphatic hydrocarbon group having 4 to about 15 (preferably 5 to 10) carbon atoms, an aromatic hydrocarbon group having 6 to about 15 (preferably 6 to 13) carbon atoms, or an araliphatic hydrocarbon group having 8 to about 15 (preferably 8 to 13) carbon atoms. Examples of such polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and -1,4-diisocyanate and mixtures of these isomers, 1-isocyanato-3,3,5-trimethyl-5-isocyanatomethylcyclohexane (German Auslegeschrift 1,202,785 and U.S. Pat. No. 3,401,100), 2,4- and 2,6-hexahydrotolylene diisocyanate and mixtures of these isomers, hexahydro-1,3-and/or -1,4-phenylene diisocyanate, perhydro-2,4'- and/or -4,4'-diphenylmethane diisocyanate, 1,3- and 1,4-phenylene diisocyanate, 2,4- and 2,6-tolylene diisocyanate and mixtures of these isomers, diphenylmethane-2,4'- and-/or 4,4'-diisocyanate, and naphthylene-1,5-diisocyanate.

Also suitable as polyisocyanates are triphenylmethane-4,4',4"-triisocyanate, polyphenyl-polymethylene polyisocyanates obtainable by aniline-formaldehyde condensation followed by phosgenation (British Patents 874,430 and 848,671), m- and p-isocyanatophenyl sulfonyl isocyanates (U.S. Pat. No. 3,454,606), perchlorinated aryl polyisocyanates (U.S. Pat. No. 3,277,138), polyisocyanates containing carbodiimide groups (U.S. Pat. No. 3,152,162), norbornane diisocyanates (U.S. Pat. No. 3,492,330), polyisocyanates containing allophanate groups (British Patent 994,890), polyisocyanates containing isocyanurate groups (U.S. Pat. No. 3,001,973), polyisocyanates containing urethane groups (U.S. Pat. Nos. 3,394,164 and 3,644,457), polyisocyanates containing acylated urea groups (German Patentschrift 1,230,778), polyisocyanates containing biuret groups (U.S. Pat. Nos. 3,124,605, 3,201,372 and 3,124,605), polyisocyanates prepared by telomerization reactions (U.S. Pat. No. 3,654,106), polyisocyanates containing ester groups (U.S. Pat. No. 3,567,763), reaction products of the above-mentioned isocyanates with acetals (German Patentschrift 1,072,385), and polyisocyanates containing polymeric fatty acid esters (U.S. Pat. No. 3,455,883). Distillation residues containing isocyanate groups from the commercial production of isocyanates, optionally dissolved in one or more of the above mentioned polyisocyanates. Mixtures of the polyisocyanates mentioned above may also be used.

The generally preferred polyisocyanates are commercially available polyisocyanates, such as 2,4- and 2,6-tolylene diisocyanate and any mixtures of these isomers ("TDI"): especially polyphenyl-polymethylene polyisocyanates that can be prepared by aniline-formaldehyde condensation followed by phosgenation ("crude MDI"); and polyisocyanates containing carbodiimide groups, urethane groups, allophanate groups, isocyanurate groups, urea groups, or biuret groups ("modified polyisocyanates"), especially modified polyisocyanates derived from 2,4- and/or 2,6-tolylene diisocyanate or from 4,4'- and/or 2,4'-diphenylmethane diisocyanate.

It is particularly preferred to use isomeric and/or homologous mixtures of polyisocyanates of the diphenylmethane series containing more than 20% by weight (preferably from 30 to 70% by weight) of 2,4'-diisocyanatodiphenylmethane. In addition to these 2,4'-isomers, the particularly preferred polyisocyanate component generally also contains other isomeric or homologous polyisocyanates of the diphenylmethane series. Thus, the particularly preferred polyisocyanate component generally comprises either mixtures of 2,4'-diisocyanatodiphenylmethane and 4,4'-diisocyanatodiphenylmethane, and optionally from 0 to 20% by weight (based on the total mixture) of 2,2'-diisocyanatodiphenylmethane, or mixtures of these isomers with generally from about 10 to 60% by weight (based on the total mixture) of higher nuclear polyphenyl-polymethylenepolyisocyanates. The diisocyanate mixture enriched with 2,4'-isomers, which is a preferred polyisocyanate component, may be obtained, for example, by distilling off a diisocyanate mixture having the given composition from a polyisocyanate mixture obtained by the phosgenation of aniline-formaldehyde condensates. The mixture containing higher nuclear polyisocyanates, which is also particularly preferred, may be obtained, for example, by mixing the last-mentioned distillation product with a phosgenation product that has been depleted of 4,4'-diisocyanatodiphenylmethane, for example, according to German Auslegeschrift 1,923,214. Such polyisocyanate mixtures containing the proportion of 2,4'-diisocyanatodiphenyl methane indicated above may be obtained directly by suitably controlling the anilineformaldehyde condensation. U.S. Pat. No. 3,277,173, for example, discloses a method for obtaining polyamine mixtures of the diphenylmethane series containing a high proportion of 2,4'-diaminodiphenylmethane. The particularly preferred polyisocyanates may be obtained by phosgenation of these condensates having a high 2,4'-diaminodiphenylmethane content. Methods of obtaining such polyisocyanate mixtures are also indicated in German Offenlegungsschrift 1,937,685 and U.S. Pat. No. 3,362,979. The particularly suitable polyisocyanate mixtures which contain higher nuclear polyisocyanates of the diphenylmethane series also have a 2,4'-diisocyanatodiphenylmethane content above 20% by weight (based on the total mixture). Monoisocyanates, for example, stearyl isocyanate, may also be included, preferably in quantities of up to 10% by weight based on the mixture of components (a) and (b).

Suitable starting components (b) include any aliphatic, cycloaliphatic, aromatic, or heterocyclic compounds containing at least 2 epoxide groups, preferably 1,2-epoxide groups. The preferred polyepoxides used as component (b) have from 2 to about 4 (preferably 2) epoxide groups per molecule and an epoxide equivalent weight of from about 90 to about 500 (preferably from 170 to 220).

Examples of suitable polyepoxides include polyglycidyl ethers of polyvalent phenols such as pyrocatechol, resorcinol, hydroquinone, 4,4'-dihydroxydiphenylmethane, 4,4'-dihydroxy-3,3'-dimethyldiphenylmethane, 4,4'-dihydroxydiphenylmethane, 4,4'-dihydroxydiphenylcyclohexane, 4,4'-dihydroxy-3,3'-dimethyldiphenylpropane, and 4,4'-dihydroxydiphenyl; of 4,4'-dihydroxydiphenylsulfone; of tris(4-hydroxyphenyl)methane; of the chlorination and bromination products of the above-mentioned diphenols; of novolaks (i.e., the reaction products of monovalent or polyvalent phenols with aldehydes, in particular formaldehyde, in the presence of acid catalysts); of diphenols obtained by the esterification of about two moles of the sodium salt of an aromatic hydroxy carboxylic acid with one mole of a dihaloalkane or a dihalo dialkyl ether (see British Patent 1,017,612); or of polyphenols obtained by the condensation of phenols and long-chain halogenated paraffins containing at least two halogen atoms (see British Patent 1,024,288).

Also suitable as component (b) are polyepoxide compounds based on aromatic amines and epichlorohydrin, such as N-di(2,3-epoxypropyl)aniline, N,N'-dimethyl-N,N'-diepoxypropyl-4,4'-diaminodiphenylmethane, and N-diepoxypropyl-4-aminophenyl glycidyl ether (see British Patents 772,830 and 816,923).

Other suitable polyepoxide compounds are glycidyl esters of polyvalent aromatic, aliphatic, and cycloaliphatic carboxylic acids, such as phthalic acid diglycidyl esters, adipic acid diglycidyl esters, and glycidyl esters of reaction products of one mole of an aromatic or cycloaliphatic dicarboxylic acid anhydride and ½ mole of a diol or 1/n mole of a polyol containing n hydroxyl groups, and hexahydrophthalic acid diglycidyl ester, optionally substituted with methyl groups.

Glycidyl ethers of polyhydric alcohols, for example, of 1,4-butanediol, 1,4-butenediol, glycerol, trimethylol propane, pentaerythritol, or polyethylene glycol, may also be used. Also suitable are triglycidyl isocyanurate, N,N'-diepoxypropyloxamide, and polyglycidyl thioethers of polyvalent thiols, for example, of bismercaptomethylbenzene, diglycidyl trimethylene trisulfone, and polyglycidyl ethers based on hydantoins.

Further examples of suitable polyepoxides include epoxidation products of polyunsaturated compounds, such as vegetable oils and their conversion products; epoxidation products of di- and polyolefines, such as butadiene, vinyl cyclohexene, 1,5-cyclooctadiene, and 1,5,9-cyclododecatriene; polymers and copolymers still containing epoxidizable double bonds, for example, those based on polybutadiene, polyisoprene, butadiene-styrene copolymers, divinyl benzene, dicyclopentadiene, and unsaturated polyesters; epoxidation products of olefins obtainable by Diels-Alder addition followed by conversion into polyepoxides by epoxidation with peroxy compounds; and epoxidation products of compounds containing two cyclopentene or cyclohexene rings linked together by bridging atoms or bridging groups. Polymers of unsaturated monoepoxides, such as methacrylic acid glycidyl ester and allyl glycidyl ether, may also be used.

Preferred polyepoxide compounds or mixtures thereof that can be used as component (b) according to the invention include polyglycidyl ethers of polyvalent phenols, in particular of bisphenol A; polyepoxide compounds based on aromatic amines, in particular bis(N-epoxypropyl)aniline, N,N'-dimethyl-N,N'-diepoxypropyl-4,4'.diaminodiphenylmethane, and N-diepoxypropyl-4-aminophenyl glycidyl ether; polyglycidyl esters of cycloaliphatic dicarboxylic acids, in particular hexahydrophthalic acid diglycidyl ester and polyepoxides obtained from the reaction product of n moles of hexahydrophthalic acid anhydride and one mole of a polyol containing n hydroxyl groups (wherein n is a number of from 2 to 6), in particular three moles of hexahydrophthalic acid anhydride and one mole of 1,1,1-trimethylol propane; and 3,4-epoxycyclohexylmethane-3,4-epoxycyclohexanecarboxylate.

Liquid polyepoxides or low viscosity diepoxides, such as bis(N-epoxypropyl)aniline or vinyl cyclohexane diepoxide, may in certain cases further lower the viscosity of already liquid polyepoxides or convert solid polyepoxides into liquid mixtures.

Phenoxypropylene oxide, styrene oxide, and glycidyl alcohol are examples of suitable monoepoxides.

Component (b) is used in a quantity corresponding to an equivalent ratio of isocyanate groups to epoxide groups of from about 1.2:1 to about 500:1.

In a preferred embodiment, polyisocyanate (a) and epoxide (b) are combined, initially in the absence of the amine component (c), according to German Offenlegungsschrift 2,807,660 to form a storage stable reaction resin mixture which is obtainable from (a) at least one organic polyisocyanate,
(b) at least one organic compound containing at least 2 epoxide groups,
(d) at least one alkylating agent which inhibits the reaction of components (a) and (b), and
(e) optionally, further auxiliary agents and additives.

The alkylating agent (d) should preferably transfer $C_1$–$C_4$ alkyl groups and should be used in a quantity of from about 0.001 to about 1% by weight (based on the sum of components (a) and (b)). Component (d) is preferably an ester of an organic sulfonic acid, methyl iodide, or dimethyl sulfate.

Suitable optional auxiliary agents and additives (e) can include the following general types, designated (e)(1) and (e)(2).

Suitable additives (e)(1) include olefinically unsaturated monomers which have no isocyanate-reactive hydrogen atoms. Typical examples of such additives include diisobutylene, styrene, $C_1$–$C_4$ alkyl styrenes such as α-methylstyrene or α-butylstyrene, vinyl chloride, vinyl acetate, maleimide derivatives such as bis(4-malimidophenyl)methane, acrylic acid $C_1$–$C_8$ alkyl esters such as acrylic acid methyl ester, acrylic acid butyl ester, or acrylic acid octyl ester, the corresponding methacrylic acid esters, acrylonitrile, and diallylphthalate. Any mixtures of such olefinically unsaturated monomers may also be used. Styrene and/or acrylic or methacrylic acid $C_1$–$C_4$ alkyl esters are preferably used. When additives (e)(1) are used, conventional polymerization initiators such as benzoyl peroxide may also be used but are generally not necessary.

Suitable additives (e)(2) include organic compounds in the molecular weight range of from 62 to about 2000 containing at least 2 (preferably 2 to 8 and more preferably 2 or 3) alcoholic hydroxyl groups of the kind known as starting components for the preparation of polyurethanes. Examples include simple polyhydric alcohols, such as ethylene glycol, hexane-1,6-diol, glycerol, or trimethylol propane; polyols containing dimethylsiloxane units, such as bis[dimethyl(hydroxymethyl)silyl]ether; polyhydroxyl compounds containing ester groups, such as castor oil and polyhydroxy polyesters such as those obtainable by the polycondensation of excess quantities of simple polyhydric alcohols of the type exemplified above with preferably dibasic carboxylic acids or their anhydrides such as adipic acid, phthalic acid, or phthalic acid anhydride; and polyhydroxy polyethers obtainable by the chemical addition of alkylene oxides, such as propylene oxide and/or ethylene oxide, to suitable starter molecules, such as water, the simple alcohols mentioned above, or amines containing at least 2 amine NH bonds. If used at all, the additives (e)(2) are used at most in the quantity corresponding to an NCO/OH equivalent ratio (based on the isocyanate groups of component (a) and the hydroxyl groups of component (e)(2)) of at least 2:1 (preferably not less than 2.5:1). The quantity of component (a) must be calculated to ensure that the equivalent ratio of isocyanate groups of component (a) to the sum of epoxide groups of component (b), hydroxyl groups of optional component (e)(2), and any hydroxyl groups present in component (b) is at least 1.2:1 (most preferably from 4:1 to 30:1).

It is generally not necessary to use auxiliary agents and additives (e)(1) or (e)(2), but when used, the additives exemplified under (e)(1) are preferred to the compounds exemplified under (e)(2). It would be possible in principle to use both types of auxiliary agents and additives.

Further examples of optionally used auxiliary agents and additives (e) include fillers, such as quartz powder, chalk or aluminum oxide; pigments, such as titanium dioxide, iron oxide, or organic pigments such as phthalocyanine pigments; plasticizers, such as dioctyl phthalate and tributyl and triphenyl phosphate; compatibility promoting agents which can be chemically incorporated, such as methacrylic acid $\beta$-hydroxypropyl ester, maleic acid esters, and fumaric acid esters; soluble dyes; and reinforcing materials such as glass fibers or glass fabrics. Carbon fibers and carbon fiber fabrics and other organic polymer fibers, such as aramide fibers or liquid crystal ("LC") polymer fibers, are also suitable.

The auxiliary agents and additives may be incorporated in the starting materials (a) and (b) before the process of the invention is carried out or they may be added at a later stage to the resin which is in a storage stable form.

To carry out the process of the invention, the starting materials (a) and (b), as well as optional components (d) and (e), or a part thereof, are initially mixed together. The accelerator amine component (c) is then added and the processible mixture is used as an impregnating resin or casting resin in the usual manner. The quantity of amine component (c) is generally selected such that the reaction resin composition contains from about 0.01 to about 10% by weight (preferably from 0.5 to 10% by weight and most preferably from 3 to 6% by weight) of the amine, based on the mixture of the polyisocyanate component and the polyepoxide component. The compositions of the invention can be kept at room temperature as liquids before hardening. The mixtures are generally hardened at room temperature after the addition of catalyst.

After-hardening of the gelled, already dimensionally stable resins is generally carried out at 100° to 250° C. (preferably at 150° to 230° C.).

The process of the invention may also be used for the preparation of impregnating materials for use as electrical insulation or for glass fiber reinforced laminates. The process of the invention is also suitable for the production of electrical products by the casting process. Such products include, for example, printed circuits, electronic clocks, pocket calculators, electronic cameras, computers, micro computers, and digital data storage devices.

The products of the process of the invention have excellent heat resistance, low dielectric losses, moisture resistance, and abrasion resistance and are easily processed in molds. The process according to the invention is also eminently suitable for the production of insulating materials of classes H and C (JEC 85/Publication 84) in electric motors and generators and for the production of construction materials for aircraft, rockets, and other equipment subjected to severe conditions.

The products may also be used for the production of insulators, transformers, and capacitors and laminates for the manufacture of pipes, containers, or sports equipment. The mixtures could also be used for the production of foams if processed in combination with suitable blowing agents.

The following examples further illustrate details for the preparation of the compounds of this invention. The invention, which is set forth in the foregoing disclosure, is not to be limited either in spirit or scope by these examples. Those skilled in the art will readily understand that known variations of the conditions and processes of the following preparative procedures can be used to prepare these compounds. Unless otherwise noted, all temperatures are degrees Celsius and all percentages are percentages by weight.

EXAMPLES

Example 1

To 120 parts by weight of a mixture of 60% of 2,4'-diisocyanatodiphenylmethane and 40% of 4,4'-diisocyanatodiphenylmethane (NCO content 33.6%) ("MDI") are mixed 30 parts by weight of the diglycidyl ether of bisphenol A (epoxide number 0.5) and 1.5 ml of a separately prepared 1 M solution of p-toluenesulfonic acid methyl ester in the above-mentioned diisocyanate mixture (MDI). The resultant mixture is heated at 120° C. with stirring under nitrogen for 30 minutes. A reactive resin having the following characteristics is obtained on cooling.

To 100 parts by weight of this storage stable reaction resin mixture are mixed 3 parts by weight of methyldibenzylamine and the resultant mixture is degassed under vacuum with stirring. The pot life at room temperature is found to be about 4 hours.

The mechanical strength properties of the resin mass are determined after the mass has solidified and has subsequently been tempered (for 4 hours each at 80° C., 120° C., 160° C., and 250° C.):

| | |
|---|---|
| Tensile strength (N/mm$^2$) | 58.1 |
| Elongation (%) | 1.6 |
| E modulus (N/mm$^2$) | 3312 |
| Flexural strength (N/mm$^2$) | 83.2 |

-continued

| | |
|---|---|
| Edge elongation (%) | 2.4 |
| Ball pressure hardness (N/mm$^2$) | 235.4 |
| Impact strength (kJ/m$^2$) | 11.2 |
| Heat distortion temperature according to Martens (°C.) | >240 |

Example 2

The pot life of the reaction resin compositions of the invention was tested by the increase in viscosity (mPa.s) at room temperature.

Starting materials include 100 parts by weight of a storage stable reaction resin prepared from the following starting components according to the method described in U.S. Pat. No. 4,783,224 (see Example 1). To 800 parts by weight of mixture of 60% of 2,4'-diisocyanatodiphenylmethane and 40% of 4,4'-diisocyanatodiphenylmethane are mixed 200 parts by weight of the diglycidyl ether of bisphenol A (epoxide number 0.585) and 0.5 ml of dimethylbenzylamine at 50° C. The mixture is heated to 120° C. for about 15 minutes and then cooled to about 90° C. The reaction is stopped by the addition of 16.5 ml of a 15.4 wt. % solution of p-toluenesulfonic acid methyl ester in the above-mentioned diisocyanate mixture. A further 596 parts by weight of the above-mentioned diisocyanate mixture and 31 parts by weight of the above-mentioned diglycidyl ether is added to the reaction mixture and the resultant mixture is stirred at 120° C. until a clear homogeneous solution is obtained. A clear yellow storage-stable resin having a viscosity of 3600 mPa.s at 23° C. and an isocyanate content of 21% is obtained.

Differing quantities (parts by weight) of methyldibenzylamine ("MDBA") catalyst according to the invention are then added to the resin thus obtained and the increase in viscosity at room temperature is determined. Test results are listed in Table 1.

Mechanical properties of molded materials prepared with and without filler using resins described in Table 1 are listed in Tables 2 and 3.

TABLE 1

Increase in viscosity at room temperature (mPa · s at 23° C.)

| Experiment No. | Parts by weight of MDBA to 100 parts by weight of resin | Initial value | After 2 hr | After 4 hr | After 6 hr | After 8 hr |
|---|---|---|---|---|---|---|
| 2.1 | 0.5 | 3600 | 3600 | 3600 | 3700 | 9300 |
| 2.2 | 1.0 | 3700 | 3700 | 3700 | solid | — |
| 2.3 | 2.0 | 3400 | 3400 | solid | — | — |
| 2.4 | 3.0 | 2900 | 3800 | solid | — | — |
| 2.5 | 5.0 | 2300 | 13600 | solid | — | — |
| 2.6 | 10.0 | 1600 | solid | — | — | — |

TABLE 2

Mechanical properties of molded materials without filler as a function of the quantity of catalyst

| | A | B | C |
|---|---|---|---|
| Experiment No. from Table 1 | 2.1 | 2.5 | 2.6 |
| Initial curing | 4 hr at each temperature of 80° C./120° C./160° C. | | |
| Post-curing | 16 hr up to 260° C. | | |
| Mechanical properties: | | | |
| Tensile strength (N/mm$^2$) | 45.5 | 44.7 | 63.7 |
| Elongation (%) | 1.5 | 1.3 | 2.0 |
| E modulus (N/mm$^2$) | 3231 | 3393 | 3560 |
| Flexural strength (N/mm$^2$) | 121.1 | 131.4 | 123.7 |
| Edge elongation (%) | 4.1 | 4.2 | 3.6 |
| Ball indentation hardness (N/mm$^2$) | 235.9 | 244 | 248 |
| Impact strength (kJ/m$^2$) | 15.8 | 14.8 | 14.8 |
| Heat distortion temperature according to Martens (°C.) | >250 | >250 | >250 |

TABLE 3

Mechanical properties of molded materials with and without filler

| | D | E | F | G |
|---|---|---|---|---|
| Experiment No. from Table 1 | 2.4 | 2.4 | 2.5 + 150 parts by weight of quartz powder (type W12) | |
| Initial curing: | 4 hr at each temperature of 80° C./120° C./160° C. | | | |
| Post-curing: | 16 hr, 200° C. | 16 hr, 250° C. | 16 hr, 200° C. | 16 hr, 250° C. |
| Mechanical properties: | | | | |
| Tensile strength (N/mm$^2$) | 57.1 | 66.7 | 72.0 | 66.8 |
| Elongation (%) | 1.9 | 2.5 | 0.8 | 0.9 |
| E modulus (N/mm$^2$) | 3410 | 3286 | 10520 | 8296 |
| Flexural strength (N/mm$^2$) | 117.7 | 123.7 | 109.6 | 117.3 |
| Edge elongation (%) | 3.59 | 4.04 | 1.16 | 1.61 |
| Ball indentation hardness (N/mm$^2$) | 247.0 | 228.5 | 459.7 | 391.3 |
| Impact strength (kJ/m$^2$) | 13.0 | 15.4 | 6.4 | 8.5 |
| Heat distortion temperature according to Martens (°C.) | 249 | 249 | >250 | >250 |

Example 3 (Comparison)

The following comparison experiment was carried out to demonstrate the surprising effect of the amine compounds of the invention compared with the known amine catalyst, dimethylbenzylamine.

To 100 parts by weight of the storage stable reaction resin mixture from Example 1 is mixed 1 part by weight of dimethylbenzylamine with stirring. The resultant mixture is immediately kept under observation at controlled temperature. An exothermic reaction begins after 7 minutes and after a total of 12 minutes the reaction temperature has risen to 110° C. The resin gels (DIN 16,945) and is solid after 13 minutes.

Example 4

The pot life of the reaction resin compositions of the invention was tested by the increase in viscosity (mPa.s) at room temperature.

Starting materials include 100 parts by weight of a storage stable reaction resin prepared from the following starting components according to the method described in U.S. Pat. No. 4,783,224 (see Example 1). To 800 parts by weight of mixture of 60% of 2,4'-diisocyanatodiphenylmethane and 40% of 4,4'-diisocyanatodiphenylmethane are mixed 200 parts by weight of the diglycidyl ether of bisphenol A (epoxide number 0.585) and 0.5 ml of dimethylbenzylamine at 50° C. The mixture is heated to 120° C. for about 15 minutes and then cooled to about 90° C. The reaction is stopped by the addition of 16.5 ml of a 15.4 wt.% solution of p-toluenesulfonic acid methyl ester in the above-mentioned diisocyanate mixture. A further 596 parts by weight of the above-mentioned diisocyanate mixture and 31 parts by weight of the above-mentioned diglycidyl ether is added to the reaction mixture and the resultant mixture is stirred at 120° C. until a clear homogeneous solution is obtained. A clear yellow storage-stable resin having a viscosity of 3600 mPa.s at 23° C. and an isocyanate content of 21% is obtained.

Differing quantities (parts by weight) of heptabenzyltetraethylenepentamine ("HBTPA") having the formula

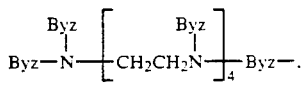

wherein Byz is benzyl, are then added to the resin thus obtained and the increase in viscosity at room temperature is determined. Test results are listed in Table 4.

Mechanical properties of molded materials prepared without filler using resins described in Table 1 are listed in Table 5.

TABLE 4

Increase in viscosity (mPa · s) at room temperature as a function of quantity of HBTPA catalyst

| Parts by weight of HBTPA to 100 parts by weight of resin mixture | Initial value | After 2 hr | After 4 hr | After 6 hr | After 8 hr | After 24 hr | After 28 hr | After 30 hr | After 32 hr | After 48 hr |
|---|---|---|---|---|---|---|---|---|---|---|
| 0.5  | 2200 | 2200 | 2300 | 2300 | 2600 | 3500    | 10000   | 13000 | 17200 | >60000 |
| 1.0  | 2200 | 2200 | 2200 | 2300 | 2600 | 24000   | >60000  | solid | —     | —      |
| 2.0  | 2200 | 2200 | 2200 | 2400 | 2600 | >60000  | solid   | —     | —     | —      |
| 3.0  | 2200 | 2200 | 2300 | 2400 | 2800 | >60000  | solid   | —     | —     | —      |
| 5.0  | 2200 | 2200 | 2500 | 2600 | 3000 | >60000  | solid   | —     | —     | —      |
| 10.0 | 2300 | 2400 | 2800 | 3000 | 3400 | >60000  | solid   | —     | —     | —      |

TABLE 5

| Mechanical properties of plate molds using HBTPA | | | | |
|---|---|---|---|---|
| Resin mixture (parts by wt.) | 100 | | 100 | |
| HBTPA (parts by wt.) | 3 | | 3 | |
| Quartz powder W12, dried (parts by wt.) | — | | 150 | |
| Initial curing: | 4 hr at each temperature of 80° C./120° C./160° C. | | | |
| Post-curing: | 16 hr, 200° C. | 16 hr, 250° C. | 16 hr, 200° C. | 16 hr, 250° C. |
| Mechanical properties: | | | | |
| Tensile strength (N/mm$^2$) | 61 | 41 | 78 | 77 |
| Elongation (%) | 1.8 | 1.4 | 0.3 | 0.9 |
| E modulus (N/mm$^2$) | 3510 | 3230 | 15800 | 10200 |
| Flexural strength (N/mm$^2$) | 109 | 121 | 131 | 115 |
| Edge elongation (%) | 2.8 | 3.7 | 1.3 | 1.3 |
| Ball indentation hardness (N/mm$^2$) | 251 | 235 | 450 | 450 |
| Impact strength (kJ/m$^2$) | 10 | 13 | 5 | 5 |
| Heat distortion temperature according to Martens (°C.) | 220 | >250 | >250 | >250 |

What is claimed is:

1. A reaction resin composition comprising a mixture of
   (a) least one polyisocyanate;
   (b) at least one epoxide; and
   (c) at least one amine of the formula

wherein

A is independently straight-chained or branched, optionally substituted, $C_1$–$C_{20}$ alkylene, $C_2$–$C_{20}$ alkenylene, $C_2$–$C_{20}$ alkynylene, $C_2$–$C_{20}$ alkylidene, $C_3$–$C_{12}$ cycloalkylene, or $C_7$–$C_{20}$ aralkenylene, m is an integer of from 0 to 30, $R^1$, $R^2$ and $R^3$ are independently optionally substituted aralkyl or polyaralkyl of the formula

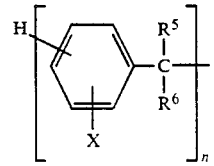

wherein $R^5$ and $R^6$ are independently hydrogen or lower alkyl,

X is hydrogen, lower alkyl, lower alkoxy, lower alkoxycarbonyl, lower alkylthiocarbonyl, or halogen, and n is an integer of from 1 to 50, and $R^4$ is straight-chained or branched, optionally substituted, $C_1$-$C_{20}$ alkyl, $C_1$-$C_{20}$ alkenyl, $C_1$-$C_{20}$ alkynyl, $C_3$-$C_{12}$ cycloalkyl, or optionally substituted aralkyl or polyaralkyl of the formula

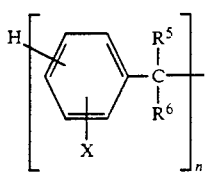

wherein $R^5$, $R^6$, X, and n are as defined above.

2. A composition according to claim 1 wherein amine component (c) is an amine having the formula

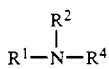

wherein $R^1$ and $R^2$ are independently optionally substituted aralkyl, wherein $R^5$ and $R^6$ are hydrogen, and $R^4$ is alkyl.

3. A composition according to claim 2 wherein the amine is methyldibenzylamine having the formula

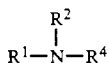

wherein $R^1$ and $R^2$ are benzyl and is methyl.

4. A composition according to claim 1 wherein amine component (c) is an amine having the formula

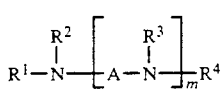

wherein m is an integer of from 1 to 5; A is ethylene or propylene; and $R^1$, $R^3$, and $R^4$ are independently optionally substituted aralkyl.

5. A composition according to claim 4 wherein the amine is heptabenzyltetraethylenepentamine having the formula

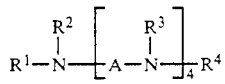

wherein A is ethylene and $R^1$, $R^2$, $R^3$, and $R^4$ and are benzyl.

6. A composition according to claim 1 wherein amine component (c) is one or more amines selected from the group consisting of dibenzylethylamine, dibenzylbutylamine, dibenzylcyclohexylamine, dibenzylstearylamine, tetrabenzylethylenediamine, tetrabenzylpropylenediamine, pentabenzyldiethylenetriamine, hexabenzyltriethylenetetramine, heptabenzyltetraethylenepentamine, and octabenzylpentaethylenehexamine.

7. A composition according to claim 1 wherein polyisocyanate component (a) is a diisocyanatodiphenylmethane.

8. A composition according to claim 1 wherein epoxide component (b) is a diglycidyl ether of bisphenol A.

9. A composition according to claim 1 wherein the quantity of the amine component (c) is from 0.01 to 10% by weight, based on the mixture of the polyisocyanate component (a) and the epoxide component (b).

10. A composition according to claim 9 wherein the quantity of the amine component (c) is from 0.5 to 10% by weight.

11. A composition according to claim 9 wherein the quantity of the amine component (c) is from 3 to 6% by weight.

12. A composition according to claim 1 wherein the quantity of the epoxide component (b) relative to the polyisocyanate component (a) corresponds to an equivalent ratio of isocyanate groups to epoxide groups of from 1.2:1 to 500:1.

13. A composition according to claim 1 wherein said composition is a liquid at room temperature.

14. A composition according to claim 1 wherein the mixture additionally comprises (d) at least one alkylating agent which inhibits the reaction of components (a) and (b).

15. A composition according to claim 14 wherein the alkylating agent is an ester of an organic sulfonic acid, methyl iodide, or dimethyl sulfate.

16. A composition according to claim 1 wherein the mixture additionally comprises (e) further auxiliary agents or additives.

17. A method for preparing insulation for electrical apparatus comprising impregnating said apparatus with a composition according to claim 1.

18. A method for preparing molded articles comprising hardening a composition according to claim 1 in a mold.

* * * * *

UNITED STATES PATENT AND TRADEMARK OFFICE
CERTIFICATE OF CORRECTION

PATENT NO. : 5,084,544

DATED : January 28, 1992

INVENTOR(S) : Hans-Peter Müller, Joachim Franke, Artur Botta

It is certified that error appears in the above-identified patent and that said Letters Patent is hereby corrected as shown below:

On the title page, item (21): Appl. No. 457,661" to --Appl. No. 475,661--.

At Column 2, line 10, correct "$R^{b5}$" to --$R^5$--.

At Column 3, line 31, correct "R3 and R4" to --$R^1$, $R^2$, $R^3$, and $R^4$--.

At Column 15, in Claim 3, Line 40, correct "and is methyl" to --and $R^4$ is methyl--.

At Column 15, in Claim 4, line 51, correct $R^1$, $R^3$, and $R^4$" to $R^1$, $R^2$, $R^3$, and $R^4$--.

Signed and Sealed this

Sixth Day of July, 1993

Attest:

MICHAEL K. KIRK

Attesting Officer

Acting Commissioner of Patents and Trademarks